United States Patent Office 3,132,638
Patented May 12, 1964

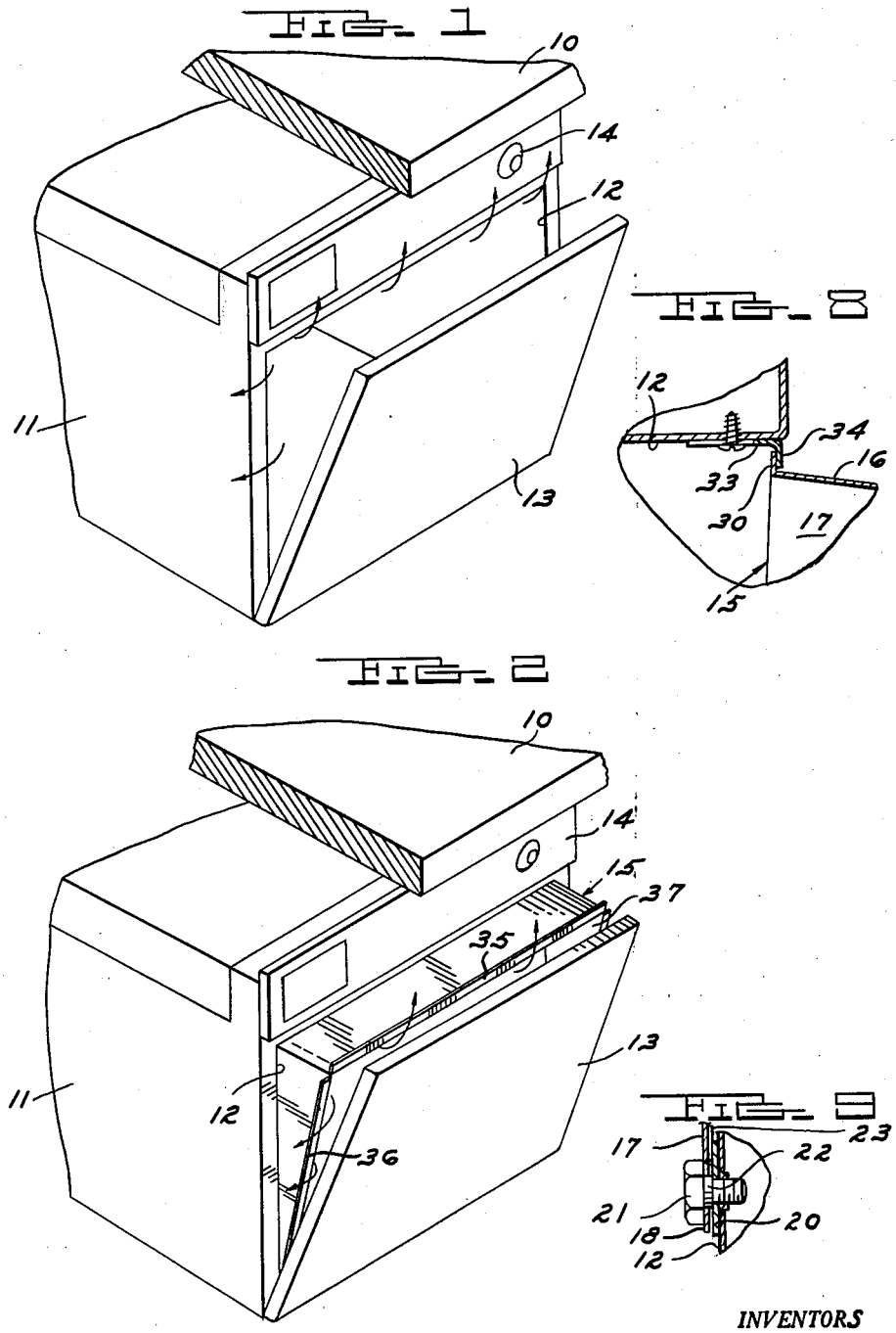

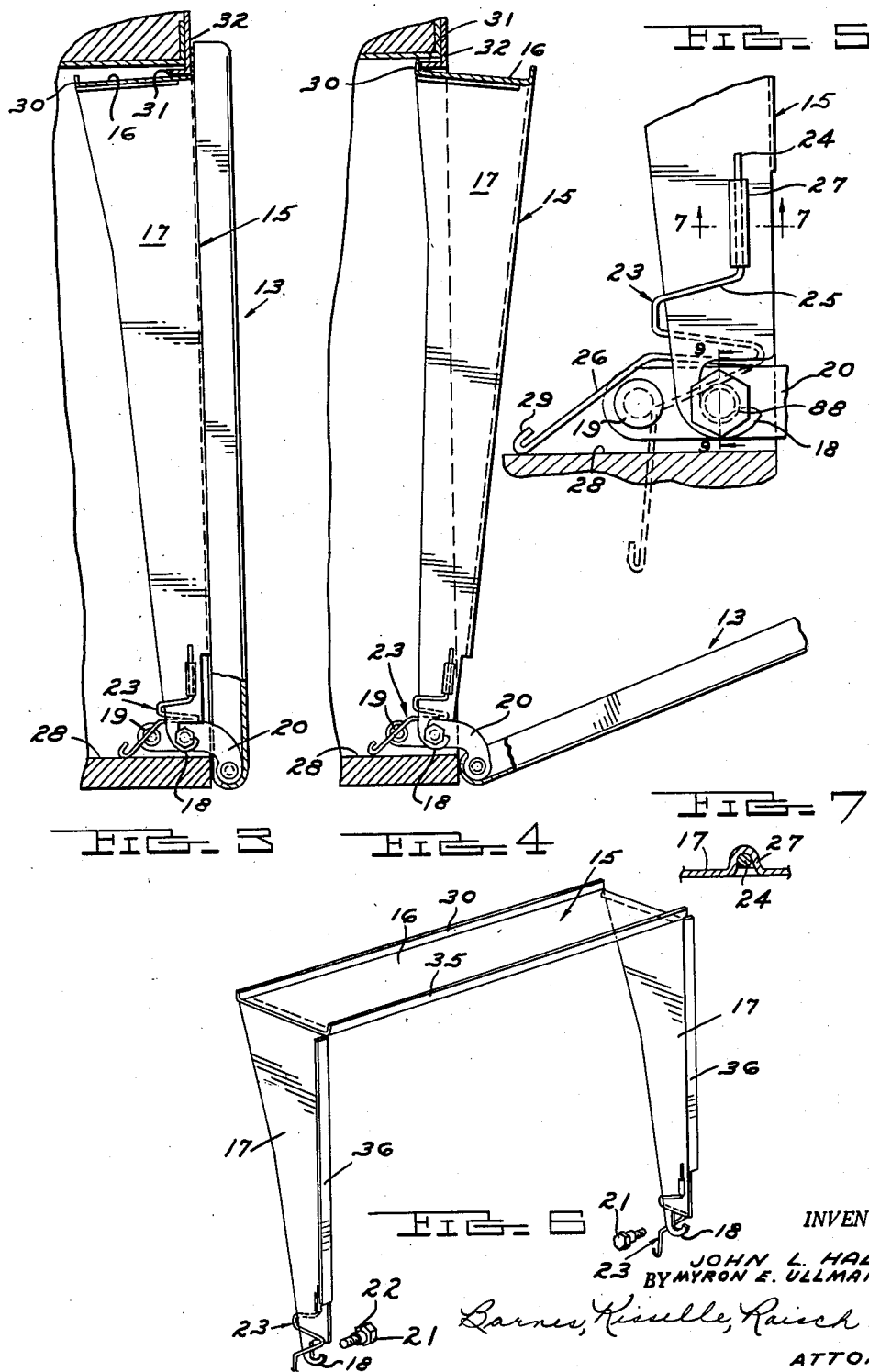

3,132,638
HEAT SHIELD FOR BUILT-IN OVENS
John L. Habe, Euclid, and Myron E. Ullman, Jr., Canfield, Ohio, assignors, by mesne assignments, to Mullins Manufacturing Corporation, Wilmington, Del., a corporation of Delaware
Filed July 28, 1961, Ser. No. 127,530
14 Claims. (Cl. 126—19)

This invention relates to built-in ovens such as under counter ovens of the type wherein a counter top is provided above an oven and the oven controls are positioned beneath the counter top and above the oven opening.

In built-in ovens, conventionally the door is hinged along the lower edge of the oven opening and adapted to be partially opened into a broiling position for broiling of foods within the oven. When the oven door is open, especially in the broiling position, the heat rising from the oven opening produces excessive temperatures on the adjacent structure along the top and sides of the oven. This heat is not only uncomfortable and produces an unsafe condition on the adjacent structure, but may cause damage and necessitate expensive repairs on the controls which are often positioned above or on the side of the oven opening. In the case of under counter ovens, the controls are usually positioned above the oven opening and beneath the counter top. The excessive heat in such cases makes the counter tops unsafe and uncomfortable and seriously affects the controls, if prolonged.

It is an object of this invention to provide a built-in oven which includes a novel heat shield that effectively prevents the heat from adversely raising the temperature of the adjacent structure and thereby makes them safe and prevents damage thereto.

It is an object of this invention to provide an under counter oven which includes a novel heat shield that effectively prevents the heat from adversely raising the temperature of the counter top and the adjacent structure and thereby makes them safe and prevents damage thereto.

It is a further object of the invention to provide such a novel heat shield which is relatively simple and low in cost.

It is a further object of the invention to provide such a novel heat shield which does not interfere with the normal operation of the door of the oven.

It is a further object of the invention to provide such a novel heat shield which can be readily cleaned without being removed.

Basically, the invention comprises an inverted U-shaped heat shield that includes a top wall and side walls extending downwardly from the top wall. The shield is pivoted at the lower ends of the side walls to the sides of the oven opening adjacent the hinge of the oven door. Springs are provided for yieldingly urging the heat shield outwardly so that when the oven door is open the heat shield is projected outwardly to extend the oven opening and serve as a means for deflecting the heat as more fully described below. Stops are provided for limiting the outward movement of the heat shield so that, even when the oven door is in broiling position, a space is provided between the oven door and the forward edge of the heat shield.

In the drawings:

FIG. 1 is a fragmentary perspective view of a conventional under counter oven.

FIG. 2 is a fragmentary perspective view of an under counter oven embodying the invention.

FIG. 3 is a vertical section of the oven shown in FIG. 2 showing the door in closed position.

FIG. 4 is a vertical section similar to FIG. 3 showing the door in open position.

FIG. 5 is a fragmentary view on an enlarged scale of a portion of the oven shown in FIG. 3.

FIG. 6 is an exploded perspective view of the heat shield assembly before mounting on the oven.

FIG. 7 is a fragmentary sectional view taken along the line 7—7 in FIG. 5.

FIG. 8 is a fragmentary sectional view showing a modified form of stop mechanism for the heat shield.

FIG. 9 is a sectional view taken along the line 9—9 in FIG. 5.

Referring to FIG. 1, the invention relates to built-in ovens and is particularly applicable to under counter ovens which comprises a counter top 10 below which is an oven 11 positioned. Oven 11 includes a rectangular oven opening 12 and a door 13 that is hinged to the lower edge of the opening 12. Such an oven may also include a control panel 14, above the opening 12 and beneath the forward edge of the counter top 10, on which the oven controls are mounted.

In such an oven when the oven door 13 is opened, the heat from the oven rises and moves laterally or sidewise as indicated by the arrows. This heat tends to raise the temperature of the control panel 14, any counter top 10 which may be above it and the cabinets or other structure along the sides of the oven. When the oven door is in broiling position, namely, in a partially open position as determined by the conventional mechanism, the concentration of heat flowing upwardly and laterally is much greater and quickly raises the temperature of the surrounding parts making them unsafe and also causing damage if the application of heat is prolonged.

According to the invention, a heat shield 15 is mounted within the opening 12 and is adapted to move or project outwardly when the oven door 13 is opened to extend the opening 12 so that the heat will be deflected forwardly and laterally so that it will clear the forward edge of the counter top and cabinets or other structure along the sides of the oven.

As shown in FIG. 6, the heat shield is made of a light weight, heat resistant material, such as a single piece of thin stainless steel or aluminum, and comprises a rectangular top panel 16 and side panels, which may be triangular, which extend downwardly from the side edges of the top panel 16. The lower end of each side panel 17 is cut away to form a C-shaped outwardly extending hook 18. In order to mount the shield in the oven, one of the two screws 19, which support hinge bracket 20 on which the door 13 is hinged, is removed and a screw 21 having a shoulder 22 is threaded in place of the screw 19. The shield is then placed in position by hooking the portions 18 over the shouldered portions 22 of the screws 21. A spring element 23 having a straight end 24, a sinuous intermediate portion 25 and a straight end 26 is provided on each side panel 17 and functions to yieldingly urge the heat shield outwardly. As shown in FIG. 5, the straight end 24 extends through a struck out portion 27 on the side panel 17. Before the heat shield 15 is mounted in position on the oven, the end 26 extends downwardly as shown in dotted lines in FIG. 5. When the heat shield is mounted in position, the end 26 is compressed against the bottom wall 28 of the oven and extends rearwardly as shown in FIG. 5. The extreme end is bent back as at 29 to provide a sliding movement for the end of the spring. The springs not only urge the heat shield outwardly but, in addition, urge the heat shield upwardly maintaining the hook portions 18 in engagement with the shoulders 22.

In order to limit the outward movement of the heat shield when the oven door 13 is opened, an upwardly extending lip 30 is provided along the rear edge of the top panel 16. When the door is opened, the springs 23 urge the heat shield outwardly until the lip 30 is brought into engagement with a downwardly projecting portion 31 formed by a trim strip 32 along the top wall of the oven opening 12. Alternatively, in the absence of a trim strip 32, a separate element 33 having a downwardly extending lip 34 can be provided along the top edge of the opening 12 as shown in FIG. 8.

The forward edges of the top panels 16 and side panels 17 are formed with outwardly extending lips 35, 36 which engage the inner surface of the oven door 13.

As shown in FIG. 3, when the oven door 13 is closed, it forces the heat shield 15 rearwardly within the oven opening. As the oven door is opened, the springs 23 urge the heat shield outwardly until the lip 30 engages the lip 31 or 34 as the case may be. The door may then be opened further without affecting the position of the heat shield 15. As shown in FIG. 2, the door 13 is in the broiling position wherein a space 37 is provided between the inner surface of the door and the forward edges 35, 36 of the heat shield. In this position, the heat is deflected forwardly by top panel 16 and is only permitted to rise after it has moved forwardly beyond the periphery of the counter top 10. Similarly, the heat is deflected forwardly by the side panels 17 and is only permitted to move laterally after it has moved forwardly beyond the adjacent cabinets. In this manner, no heat is applied directly to the control panel 14, to the counter top 10 or the adjacent structures reducing the temperature thereof and preventing damage by prolonged application of heat thereto.

When it is desired to clean the heat shield, the oven door 13 is opened, the heat shield is grasped adjacent the top panel 16 and pushed downwardly to disengage the hook portions 18 from the shoulders 22 of the screws 21 permitting the heat shield to clear stop 31 so that the heat shield can drop forwardly for cleaning.

It can thus be seen that there has been provided a heat shield assembly that is relatively simple and inexpensive and which effectively prevents excessive heating of the counter top or the adjacent cabinets or fixtures. Although the heat shield has been described particularly in connection with counter tops, it should be apparent that it also has advantages when used in connection with other types of oven arrangements wherein it is desired to prevent the heat from moving directly to the adjacent surfaces.

I claim:

1. The combination comprising an oven having an access opening extending into the interior of the oven, a door, means for hinging the door along a portion of the periphery of the opening for movement toward and away from a closed position overlying the opening, a heat shield having wall portions extending around the remainder of the periphery of the oven opening, means for mounting said shield within said opening adjacent the periphery thereof for movement from a position within the opening to a position extending outwardly from the opening when the door is opened, spring means yieldingly urging said heat shield into outwardly projected position, and means for limiting the outward movement of said shield, said limiting means comprising interengaging means between said heat shield and said oven, said wall portions of said shield extending along and outwardly beyond substantially the entire remainder of the periphery of said oven opening when the door is opened.

2. The combination set forth in claim 1 wherein said means for mounting said shield comprises pivot means closely adjacent said hinge means for said door.

3. The combination comprising a counter top, an oven mounted beneath said counter top and having an opening adjacent one end thereof beneath said counter top, said opening having top, bottom and side edges, a door, means for hinging said door along the bottom edge of said oven opening for swinging movement from closed position to a substantially horizontal open position, a generally U-shaped heat shield comprising a top wall and side walls extending downwardly from said top wall, means for pivoting said heat shield to said oven adjacent the interior of said oven opening at the lower ends of said side walls of the shield and closely adjacent the bottom edge of said oven opening, said top and side walls of said shield extending along and being substantially coextensive with top and side edges of said oven opening, spring means yieldingly urging said heat shield outwardly so that the heat shield is swung outwardly when the door is opened, and stop means for limiting the outward movement of said heat shield, said top and side wall portions having a length and width such that they extend along substantially the entire length of said top and side edges of said oven opening and outwardly therefrom when the door is opened.

4. The combination set forth in claim 3 wherein said stop means comprises a lip extending generally upwardly from the rear edge of the top wall of the heat shield and a downwardly extending projection on the top edge of the oven opening adapted to be engaged by said lip.

5. The combination set forth in claim 3 wherein said spring means comprises a spring element having one end thereof engaging said heat shield and the other end thereof engaging said oven.

6. The combination set forth in claim 3 wherein said spring means comprises a wire having one end fixed to a side wall of said heat shield, a sinuous intermediate portion, and the other end thereof extending rearwardly and slideably engaging the top surface of the bottom of the oven.

7. The combination set forth in claim 3 wherein said means for pivoting said heat shield comprises a screw threaded into the sides of the oven opening, said screw having a shouldered portion, the lower end of each side wall of the heat shield being cut away to provide an outwardly opening hook portion that is engaged with the shouldered portion of the corresponding screw.

8. The combination set forth in claim 3 including outwardly extending lips along the forward edge of the top and side walls of the heat shield adapted to engage the door of the oven when the door is closed.

9. The combination comprising an oven, said oven having an oven opening, control means for said oven above the oven opening, a door, means for hinging the door along the lower edge of the oven opening, a heat shield comprising a top wall and side walls extending downwardly from the top wall, means for pivoting said heat shield within the oven opening adjacent the lowermost ends of the side walls of the heat shield and closely adjacent the bottom edge of said oven opening, said top and side walls of heat shield extending along and being substantially coextensive with top and side edges of said oven opening, a spring element having one end thereof fixed to said heat shield and the other end thereof slidingly engaging the floor of the oven and yieldingly urging the heat shield outwardly against the door, said shield preventing hot gases and heat from contacting the control means when the oven door is open, and interengaging means between the heat shield and the top of the oven for limiting the outward movement of the heat shield, said shield when in its outermost position preventing hot gases and heat from contacting said control means directly.

10. A heat shield assembly for an oven having an oven opening adjacent one end thereof, controls for said oven positioned adjacent said oven opening, a door, and means for hinging said door along the bottom edge of said oven opening for swinging movement from closed position to a horizontal open position, said assembly comprising a generally U-shaped heat shield having a top wall and side walls extending downwardly from said top wall, means for pivoting said heat shield to the oven adjacent the interior of said oven opening at the lower ends of said side walls of the shield, spring means adapted to yieldingly urge said heat shield outwardly so that the heat shield is swung outwardly when the door is opened, and stop means on said shield adapted to cooperate with said oven for limiting the outward movement of said heat shield, said top and side wall portions having a length and width such that they extend along substantially the entire length of the top and side edges of said oven opening and outwardly therefrom when the assembly is in position and the door is opened.

11. The combination set forth in claim 10 wherein said stop means comprises a lip extending generally upwardly from the rear edge of the top wall of the heat shield and adapted to engage a downwardly extending projection on the oven.

12. The combination set forth in claim 10 wherein said spring means comprises a spring element having one end thereof engaging said heat shield and the other end thereof adapted to slidingly engage the oven.

13. The combination set forth in claim 10 wherein said spring comprises a wire having one end fixed to the heat shield, a sinuous intermediate portion, and the other end thereof extending rearwardly and adapted to slideably engage the top surface of the bottom of the oven.

14. The combination set forth in claim 10 wherein said means for pivoting said heat shield comprises a screw adapted to be threaded into the side of the oven opening, said screw having a shouldered portion, the lower end of each side wall of the heat shield being cut away to provide an outwardly opening hook portion that is engaged with the shouldered portion of the corresponding screw.

References Cited in the file of this patent

UNITED STATES PATENTS

| | | |
|---|---|---|
| 57,240 | Wiswall | Aug. 14, 1866 |
| 880,577 | Rust | Mar. 3, 1908 |
| 1,543,510 | Nicolaus | June 23, 1925 |
| 1,604,503 | Tinnerman | Oct. 26, 1926 |
| 1,755,063 | Holden | Apr. 15, 1930 |
| 2,526,890 | Mendel | Oct. 24, 1950 |
| 2,557,749 | Lundine | June 19, 1951 |
| 2,823,664 | Evans | Feb. 18, 1958 |
| 2,865,653 | Nixon | Dec. 23, 1958 |

FOREIGN PATENTS

| | | |
|---|---|---|
| 193,393 | Germany | Dec. 30, 1907 |
| 457,931 | Great Britain | Dec. 8, 1936 |